April 21, 1936.  H. C. WRIGHT  2,038,256
HOUSEHOLD MIXER
Filed May 13, 1932
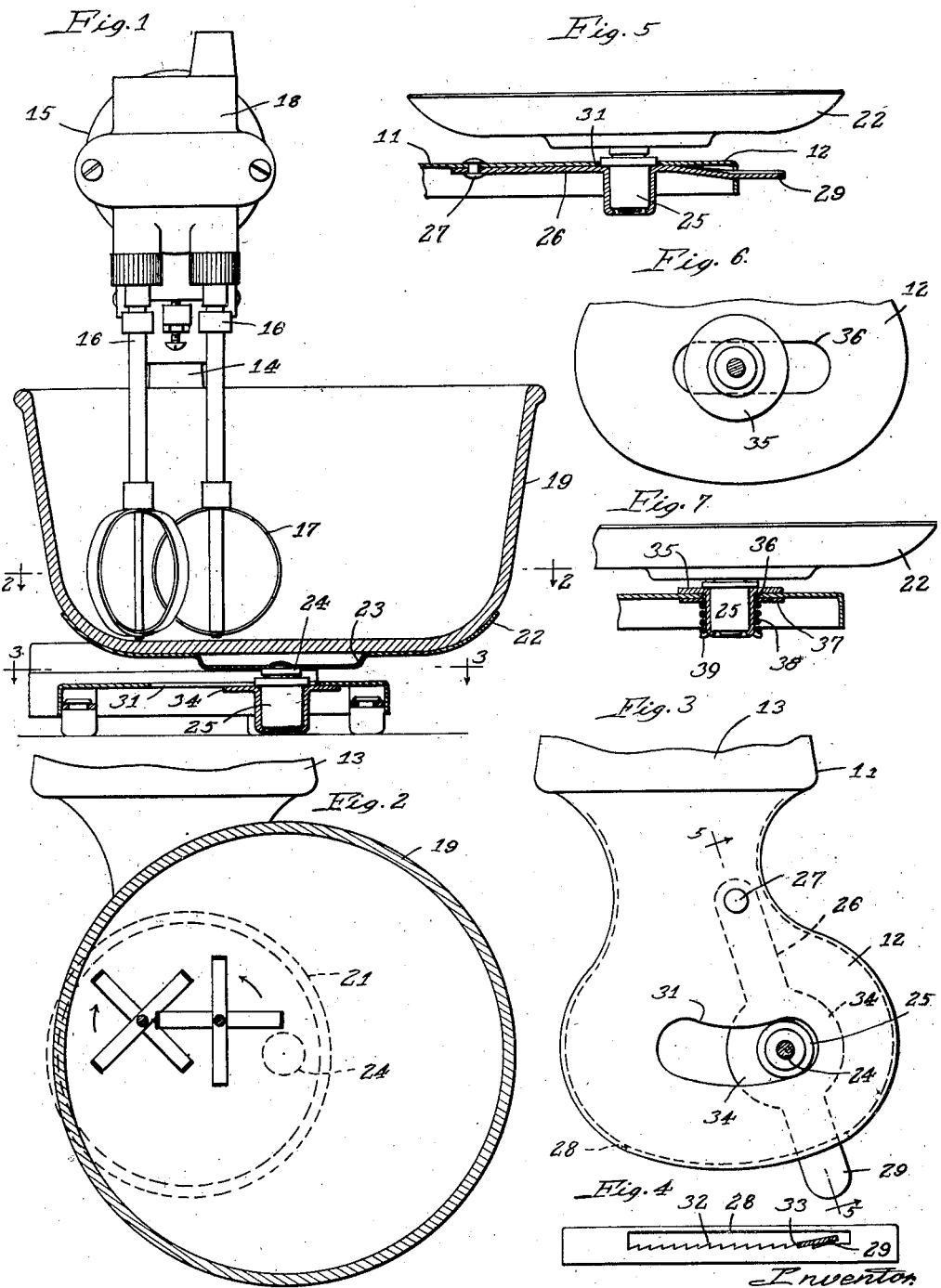
Inventor
Horace C. Wright
By
Wilson, Dowell, McCanna & Helm
Attys.

Patented Apr. 21, 1936

2,038,256

UNITED STATES PATENT OFFICE 2,038,256

HOUSEHOLD MIXER

Horace C. Wright, Oak Park, Ill., assignor to Chicago Flexible Shaft Company, Chicago, Ill., a corporation of Illinois Application May 13, 1932, Serial No. 611,145

3 Claims. (Cl. 259—84)

This invention relates to mixers of the household type.

It is desired in mixers of this type to use mixing bowls of different sizes or diameters according to the nature and quantity of the ingredients being mixed. It is also desired to support the selected mixing bowl so that it is free to be rotated by the action of the beater element on the contents of the bowl and by such contents against the side wall of the bowl. Heretofore, this has been attained by supporting the mixing bowl, large or small, on a turntable and by providing separate mountings for the turntable so that it may be removed from one mounting and placed in another according to the diameter of the bowl selected, in each mounting the side wall of the respective bowl being located in fixed proximity to the beater element. While for general purposes this fixed proximity between the side wall of the bowl and the beater element has its advantages, nevertheless, there are times when, because of the nature of the ingredients and the work to be performed, the bowl may be rotated too rapidly or at a speed not suitable for the work. The chief object of my invention is, therefore, to provide means for controlling the speed of rotation of the mixing bowl while the bowl is free to rotate in either direction and rotation is imparted by the action of the beater element on the contents of the bowl and without removing the bowl or the turntable, as the case may be, from its mounting.

To this end my invention contemplates the provision of a mounting for one or more bowls so that the selected bowl may rotate freely about a vertical axis with the side wall of the bowl in operative relation to a rotary beater element, and means for effecting relative horizontal movement between the side wall of the bowl and the beater element without removing the bowl from its mounting for the purpose of controlling the speed of rotation of the bowl.

Other objects and attendant advantages will be appreciated as the invention becomes better understood by reference to the following description when considered in connection with the accompanying drawing, in which—

Figure 1 is a front elevation of a household mixer with the mixing bowl and its mounting in vertical section, embodying my invention;

Figs. 2 and 3 are plan sections taken on the lines 2—2 and 3—3, respectively, of Figure 1;

Fig. 4 is a front view of the base shown in Fig. 3;

Fig. 5 is a vertical section taken on the line 5—5 of Fig. 3, with the bowl supporting turntable in elevation;

Fig. 6 is a plan section similar to Fig. 3 but showing a modified form of bowl mounting; and Fig. 7 is a vertical section taken on the line 7—7 of Fig. 6.

My invention is applicable to any mixer, particularly of the type adapted for household uses, such as the mixing and beating of liquids and batters, mashing and whipping potatoes, and the mixing and folding of ingredients of different kinds as in making cakes, omelets, meat loaves, etc. In these practices, it is desirable to use mixing bowls of different diameters, such for example as a set of bowls comprising a large and a small diameter bowl, and to mount the selected bowl so that it will be rotated freely by the action of the beater element on the contents of the bowl. Heretofore, bowls of this kind have been supported on a turntable and provision has been made for mounting the turntable in separate bearings or supports at different locations on a base so that by removing and remounting the turntable it would be properly located with respect to the heater element according to the mixing bowl being used. As a result of such an arrangement the beater element was located in fixed proximity to the side wall of each bowl which has its desirable features so far as general use is concerned but lacks any means for varying the speed of rotation of the bowl except by changing the speed of the batter element. My invention provides for controlling the speed of rotation of any selected bowl without removing the bowl from its mounting and consequently enables the operator to quickly and easily obtain the desired proximity between the rotating beater element and the side wall of the mixing bowl according to the conditions at hand.

In the drawing I have shown a mixer of the kind disclosed in application, Serial No. 481,193, filed September 11, 1930. This includes a base designated generally by 11 having a bowl supporting portion 12 and a motor supporting portion 13, the latter carrying an upright standard 14 carrying an electric motor 15 which over-reaches the bowl supporting portion 12 and is equipped at its forward end with one or more vertical beater shafts 16 each having at its lower end a beater element 17. In this construction the motor 15 is pivotally mounted on the standard 14 to swing about a horizontal axis so that by such movement the beater element may be swung from the vertical operative position here shown to an inoperative position above the top of the mixing bowl. The beater elements will be rotated in the directions shown by the arrows in Fig. 2 through the intermediary of reduction gearing in the gear box 18 driven by the motor. The present invention, however, contemplates the use of one or more beater elements mounted in any suitable manner and driven by any suitable means, providing only that the beater element occupies an operative position in the mixing bowl for performing its function.

Two mixing bowls 19 and 21 are shown each adapted to be supported on a turntable designated generally by 22. This turntable, as well as its bearing mounting, is the subject matter of a separate application for patent, Serial No. 618,975, filed June 23, 1932, which has now matured into Patent No. 1,926,910, Sept. 12, 1933, in which case the turntable is shaped to provide an annular seat for the base of the bowl 19, as shown in Fig. 1, and a separate concentric seat 23 for the base of the smaller bowl 21. The turntable also has attached to its bottom a fixed spindle 24 mounted on roller bearings in a casing 25. This casing is retained in position on the spindle 24 and constitutes a unit with the turntable and is, therefore, removable with the latter.

In the form of my invention shown in Figs. 1-5, inclusive, the bearing casing 25 is suitably supported on a lever 26 which is pivotally attached at one end to the base at 27 and projects at its opposite end through an opening 28 in the front apron of the base, the projecting end 29 serving as a handle by means of which the lever may be swung back and forth in a horizontal plane. To permit of this movement the base portion 12 is provided with an arcuate opening 31 for passage of the turntable mounting, as clearly shown in Fig. 3. Suitable means is provided for retaining the lever in any position to which it may be moved consisting, in the present instance, of serrations 32 formed along the lower edge of the opening 28 and a detent 33 formed on one edge of the lever handle 29 for engagement with the serrations. In this form the turntable and mixing bowl are supported on the lever which in turn is supported at both ends on the base and has lateral projections 34 which bear against the under side of the base and prevent tilting of the lever.

With the parts as shown in Figs. 1, 2, and 3, it will be apparent that the handle 29 of the lever may be moved either to the left or the right to increase or decrease the distance between the side wall of the bowl 19 and the adjacent beater element. By such adjustment the speed of rotation of the bowl is definitely controlled, it being apparent, as described above, that the bowl, together with the turntable, is free to rotate as a unit in the bearing casing 25 and will be rotated by the action of the beater element on the contents of the bowl. Control of the speed of rotation of the bowl is desirable in certain operations, since it permits the operator to quickly and easily secure the most effective mixing or beating of the particular ingredients.

In Figs. 6 and 7 I have shown another form of my invention in which the turntable is mounted on a slide or carriage 35 slidable back and forth in a rectilinear path in a slot-way 36 in the base portion 12. This slidable mounting of the turntable may be accomplished by any suitable means, in this particular instance the slidable part 35 being retained in position by a spring-pressed member 37 acting against the under side of the base portion 12, a coiled spring 38 being used and retained against downward displacement by lugs 39 on the carriage 35. The bowl mounting is thus slidable back and forth on the base through the same range of movement as effected by the lever 26 and it is yieldingly retained in any set position by reason of the frictional engagement imposed by the spring-pressed member 37.

From the foregoing it will be manifest that I have provided means operative between the beater element and the mixing bowl whereby relative movement may be obtained between the side wall of the bowl and the beater element for the purpose of controlling the speed of rotation of the bowl without removing the bowl from its mounting. It should be manifest that this relative movement may be obtained in various ways and that my invention in its broad sense is not to be circumscribed by effecting this movement by means of adjusting the beater element instead of the bowl. Furthermore, the mixing bowl and the turntable may be considered as a unitary structure insofar as concerns the function of controlling the speed of rotation of the bowl, although the turntable provides a desirable support for flat bottom bowls of different diameters. My invention may, therefore, be embodied in different forms and constructions within the spirit and scope of the appended claims.

I claim:

1. A household mixer comprising a base having a bowl-supporting portion at one end and a motor-supporting portion at the opposite end, a motor driven beater mounted on said motor-supporting portion having a vertical beater element positioned above said bowl-supporting portion, a mixing bowl, a turntable having a central depending spindle and constructed for carrying the bowl concentric with respect to said spindle, a bearing casing in which the spindle is journaled, a lever having a socket intermediate its ends for reception of said bearing casing, the lever being disposed beneath the base and pivotally mounted at one end on the base to swing about a vertical axis and having a handle at its opposite end adapted to be manipulated to move the turntable horizontally, the bowl-supporting portion of the base having an elongated opening for passage of said spindle when the latter is supported in said socket with the turntable positioned above the base, the parts being arranged so that upon moving the handle horizontally, the lever will be swung on its pivot to move the side wall of the mixing bowl into greater or lesser proximity to the beater element, the mixing bowl being free to rotate through its spindle mounting, whereby said lever is operable to control rotation of the mixing bowl by varying the effective action of the contents against the walls of the mixing bowl.

2. In a mixing machine having a base and a laterally fixed mixing implement, a slot in said base, a lever pivoted to said base and having its other end extending outward from said base, a ferrule on said lever extending into said slot, a turntable having concentric flanges for receiving and restraining vessels of different diameters, and a stud on the bottom of said turntable fitting into the ferrule, whereby said turntable may be moved laterally to locate vessels with respect to the mixing implement.

3. In a mixing machine having a base, a slot in said base, a standard thereon carrying a motor offset laterally at its upper end, a pair of vertical spindles rotatably driven from said motor and carrying beaters thereon, a lever pivoted to said base and having its free end extending outwardly from said base and providing a handle for moving it, a ferrule on said lever extending into said slot, a turntable having a flange for receiving and restraining a vessel, and a stud on the bottom of said turntable fitting into said ferrule rotatably mounting the turntable on the lever, whereby said turntable may be moved laterally to locate the vessel with respect to the mixing implement during operation of the mixing machine.

HORACE C. WRIGHT.